W. WELLS.
DRAFT EQUALIZER.
APPLICATION FILED SEPT. 16, 1916.
1,212,718.
Patented Jan. 16, 1917.
2 SHEETS—SHEET 1.
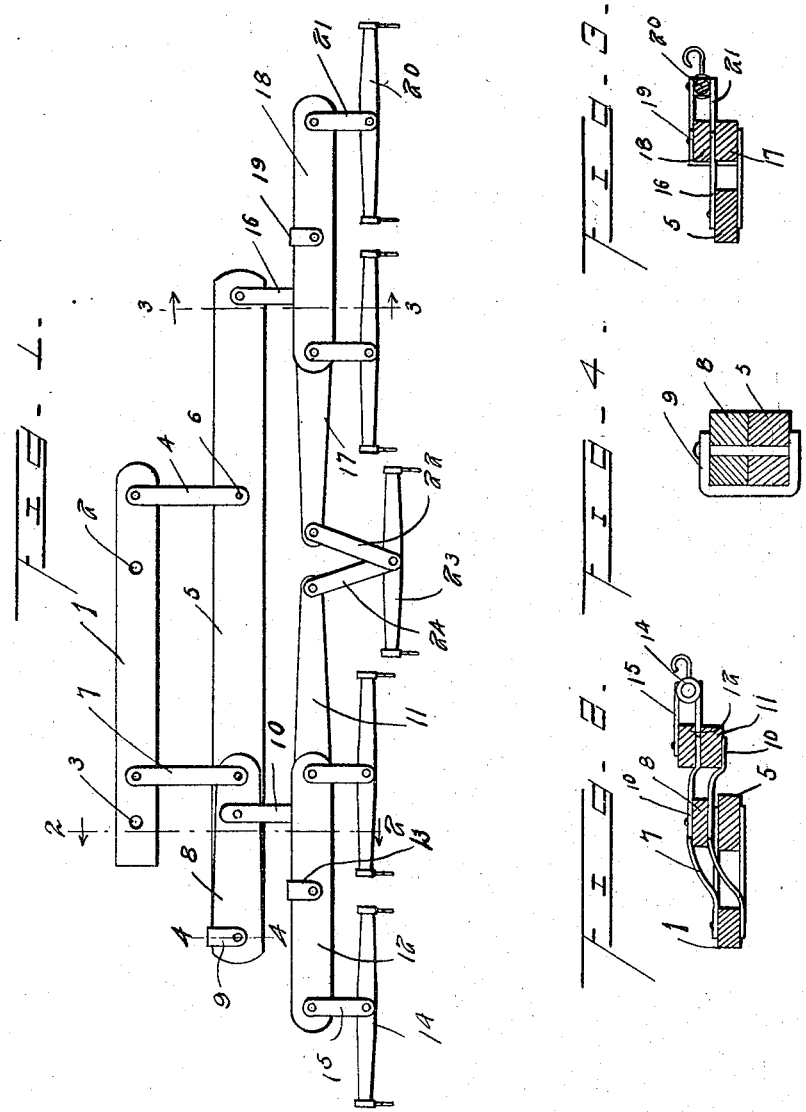
Witnesses
A. R. Stanton
Wm. F. Davidson
Inventor
W. Wells.
By A. Randolph Jr.,
Attorney W. WELLS.
DRAFT EQUALIZER.
APPLICATION FILED SEPT. 16, 1916.
1,212,718.
Patented Jan. 16, 1917.
2 SHEETS—SHEET 2.
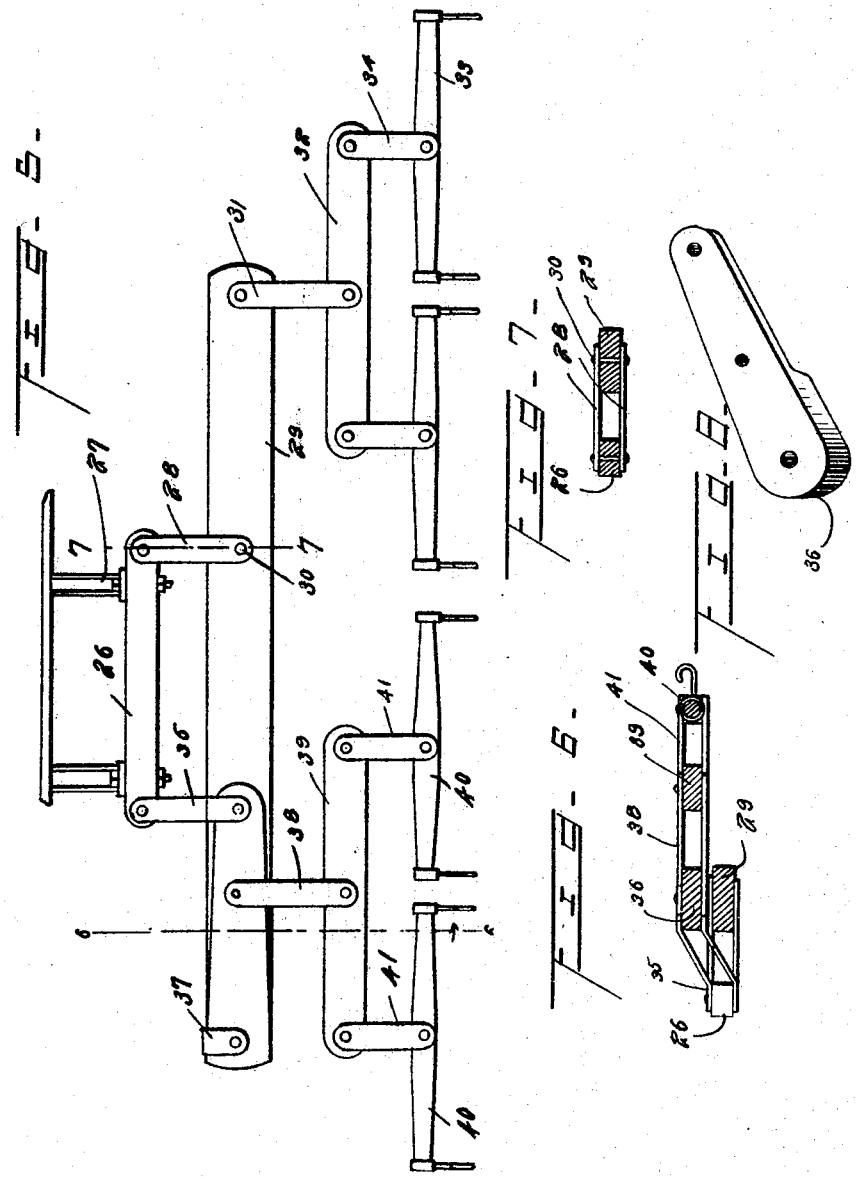
Witnesses
A. B. Stanton
Wm. F. Davidson
Inventor
W. Wells.
By A. Randolph Jr.
Attorney

UNITED STATES PATENT OFFICE.

WILLIAM WELLS, OF DOLAND, SOUTH DAKOTA.

DRAFT-EQUALIZER.

1,212,718.  Specification of Letters Patent.  Patented Jan. 16, 1917.

Application filed September 16, 1916. Serial No. 120,566.

*To all whom it may concern:*

Be it known that I, WILLIAM WELLS, a citizen of the United States, residing at Doland, in the county of Spink and State of South Dakota, have invented certain new and useful Improvements in Draft-Equalizers; and I do hereby declare the following to be a full, clear, and exact description of the invention, such as will enable others skilled in the art to which it appertains to make and use the same.

This invention relates to a draft equalizer and has for its primary object the provision of a double hitch, whereby the draft is hitched to each end of the cross clevis of a plow or like farm implement to allow the draft animals to walk straight and the plow or like implement to run square, preventing the land side of the plow from wearing and also relieving the wheel box cap from end wear and thrust.

Another object of this invention is to provide means whereby the draft animals may work abreast, with one animal in the furrow and the rest upon the unplowed ground, without side draft, and each animal pulling their equal share.

A still further object of this invention is the provision of a draft equalizer of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a plan view of a draft equalizer for five draft animals, constructed in accordance with my invention, Fig. 2 is a transverse sectional view taken on the line 2—2 looking in the direction indicated by the arrows, Fig. 3 is a similar view taken on the line 3—3 of Fig. 1 looking in the direction indicated by the arrows, Fig. 4 is a detail transverse sectional view taken on the line 4—4 of Fig. 1, Fig. 5 is a plan view of a four draft animal equalizer, constructed in accordance with my invention, Fig. 6 is a transverse sectional view taken on the line 6—6 of Fig. 5, Fig. 7 is a detail transverse sectional view taken on the line 7—7 of Fig. 5, and Fig. 8 is a detail perspective view of an equalizing lever.

Referring in detail to the drawings, the numeral 1 indicates a cross clevis which is secured to a plow or like farming implement at two points as illustrated at 2 and 3 by any suitable fastening means. A pair of relatively spaced arms 4 are pivoted to one end of the cross clevis 1 and are pivoted to a timber 5 at a point as illustrated at 6. A pair of relatively spaced arms 7 are pivoted to the cross clevis 1 adjacent the point of attachment 3 and are pivoted to one end of a bar 8 which is in turn pivoted at the other end thereof to one end of the timber 5 by means of a substantially U-shaped bracket 9. A pair of arms 10 are pivoted to the bar 8 adjacent the pivot point of the pair of arms 7 and pivoted adjacent one end of an equalizing level 11 which has pivoted to its short end a double tree 12 by means of a substantially U-shaped clamp 13. Swingle trees 14 are secured to each end of the double tree 12 by pairs of arms 15 whereby a pair of draft animals may be hinged to the double tree 12. A pair of arms 16 are pivoted to the outer end of the timber 5 and adjacent one end of an equalizing lever 17. A double tree 18 is pivoted to the outer or shorter end of the equalizing lever 17 by means of a substantially U-shaped clamp 19 and has pivoted to each end a pair of swingle trees 20 by arms 21, so that a pair of draft animals may be hitched to the double tree 18. A pair of arms 22 are pivoted to the inner or longer end of the equalizing lever 17 and centrally to a swingle tree 23. A pair of arms 24 are pivoted to the outer or longer end of the equalizing lever 11 and to the swingle tree 23 at their point of attachment of the arms 22 thereon, whereby a fifth draft animal may be hitched to the device and will counterbalance the pull of the other four draft animals.

From the foregoing description taken in connection with the accompanying drawings, it will be noted a provision is made for a double hitch, whereby the draft is hitched to each end of the cross clevis of the plow or like farming implement and allow the draft animals to walk in a straight path and the plow or like implement to run square, preventing the land sides thereof from wearing and also provides means whereby the draft animals work abreast, with one animal in the furrow and the rest upon the unplowed ground, and each animal pulling its equal share. The foregoing description relates to my draft equalizer of five horse.

Referring to my invention as disclosed in Figs. 5 to 8 for a four horse draft equalizer, it consists of a cross clevis 26 secured to a plow or like farming implement adjacent each end thereof by fastening means 27. Pivoted to one end of the cross clevis 26 are a pair of arms 28 which are in turn pivoted to a timber 29 at a point as illustrated at 30, providing a short and long end to the timber. A pair of arms 31 are pivoted to the outer or shorter end of the timber 29 and are in turn pivoted to a double tree 32. The double tree 32 has pivoted to each end a swingle tree 33 by means of arms 34, whereby a pair of draft animals may be hitched to the double tree 32. A pair of arms 35 are pivoted to the end of the cross clevis 26 opposite from the arms 28 and are in turn pivoted to the balancing or equalizing bar 36 intermediate its ends. The bar 36 is pivoted at one end to the inner or longer end of the timber 29 by a substantially U-shaped clamp 37 so as the bar 36 overlies the timber as clearly illustrated in Fig. 5. A pair of arms 38 are pivoted to the free end of the bar 36 and centrally to a double tree 39. The double tree 39 has pivotally connected to each end thereof swingle trees 40 by means of arms 41, whereby a pair of draft animals may be hitched to the double tree 39.

From the foregoing description it will be noted that an equalizer has been provided whereby four draft animals may be hitched abreast and so constructed that one draft animal will walk in the furrow while the other draft animals walk upon unplowed ground.

While I have shown and described the preferred embodiment of my invention, it will be understood that minor changes in construction, combination and arrangement of parts may be made without departing from the spirit and scope of the invention as claimed.

Having thus described my invention, what I claim is:—

A draft equalizer comprising a cross clevis having a double point hitched to a plow, a timber pivoted to one end of the cross clevis and having a long and short end, an equalizing lever pivoted to the short end of the timber and having a long and short end, means for hitching a pair of horses to the short end of the equalizing lever, a balancing bar pivoted at one end thereof to the longest end of the timber, means for pivotally connecting the other end of the bar to the cross clevis, an equalizing lever pivoted to the bar and having a long and short end, means for hitching a pair of draft animals to the short end of the second mentioned equalizing lever, and means for hitching a fifth draft animal to the longer ends of the equalizing levers so that the fifth draft animal will equalize the pull of the remaining draft animals.

In testimony whereof I affix my signature in presence of two witnesses.

WILLIAM WELLS.

Witnesses:
 GEO. GROSS,
 JOHN H. LEVSEN.

Copies of this patent may be obtained for five cents each, by addressing the "Commissioner of Patents, Washington, D. C."